US008833862B2

(12) United States Patent
Günther

(10) Patent No.: US 8,833,862 B2
(45) Date of Patent: Sep. 16, 2014

(54) WHEEL

(75) Inventor: Wolfgang Günther, Salzgitter (DE)

(73) Assignee: KUKA Laboratories GmbH, Augsburg (DE)

(*) Notice: Subject to any disclaimer, the term of this patent is extended or adjusted under 35 U.S.C. 154(b) by 1221 days.

(21) Appl. No.: 11/995,056

(22) PCT Filed: Aug. 8, 2006

(86) PCT No.: PCT/DE2006/001390
§ 371 (c)(1),
(2), (4) Date: Sep. 12, 2008

(87) PCT Pub. No.: WO2007/016917
PCT Pub. Date: Feb. 15, 2007

(65) Prior Publication Data
US 2009/0065113 A1  Mar. 12, 2009

(30) Foreign Application Priority Data

Aug. 9, 2005 (DE) .................. 20 2005 012 682 U

(51) Int. Cl.
*B60B 19/00* (2006.01)
*B60B 19/12* (2006.01)

(52) U.S. Cl.
CPC ......... *B60B 19/125* (2013.01); *B60B 2360/324* (2013.01); *B60B 2900/351* (2013.01); *B60B 19/003* (2013.01)
USPC ........................................ 301/5.23

(58) Field of Classification Search
USPC ................ 301/5.1, 5.23; 16/18 R, 45, 46, 47; 180/7.2
See application file for complete search history.

(56) References Cited

U.S. PATENT DOCUMENTS 3,789,947 A * 2/1974 Blumrich ...................... 180/6.48
3,876,255 A * 4/1975 Ilon ............................. 301/5.23
4,237,990 A * 12/1980 La ................................ 180/7.1
4,598,782 A * 7/1986 Ilon ............................... 180/7.1

(Continued)

FOREIGN PATENT DOCUMENTS

| DE | 2354404 | 5/1974 |
| DE | 3841971 | 6/1990 |
| EP | 0147602 A2 | 7/1985 |
| WO | 86/03132 A1 | 6/1986 |

OTHER PUBLICATIONS

European Patent Office, International Search report in PCT Application No. PCT/DE2006/001390 dated Jan. 3, 2007.

*Primary Examiner* — Kip T Kotter
(74) *Attorney, Agent, or Firm* — Wood, Herron & Evans, LLP

(57) ABSTRACT

The invention relates to a wheel (1) with a driven wheel body (2), comprising two support elements (21, 22), between which a number of roller bodies (3) with a spherical surface are arrange to rotate, which at least partly extend beyond the circumference of the support elements (21, 22) the rotational axes of which are arranged at an angle to the rotational axis (23) of the wheel body (2). The ratio of the outer diameter (Du) of the wheel (1) to the maximum radius (Ra) of the roller body (3) is between 1.08 and 1.13, in particular, between 1.09 and 1.12.

9 Claims, 3 Drawing Sheets

(56) References Cited

U.S. PATENT DOCUMENTS

Figure 2A:
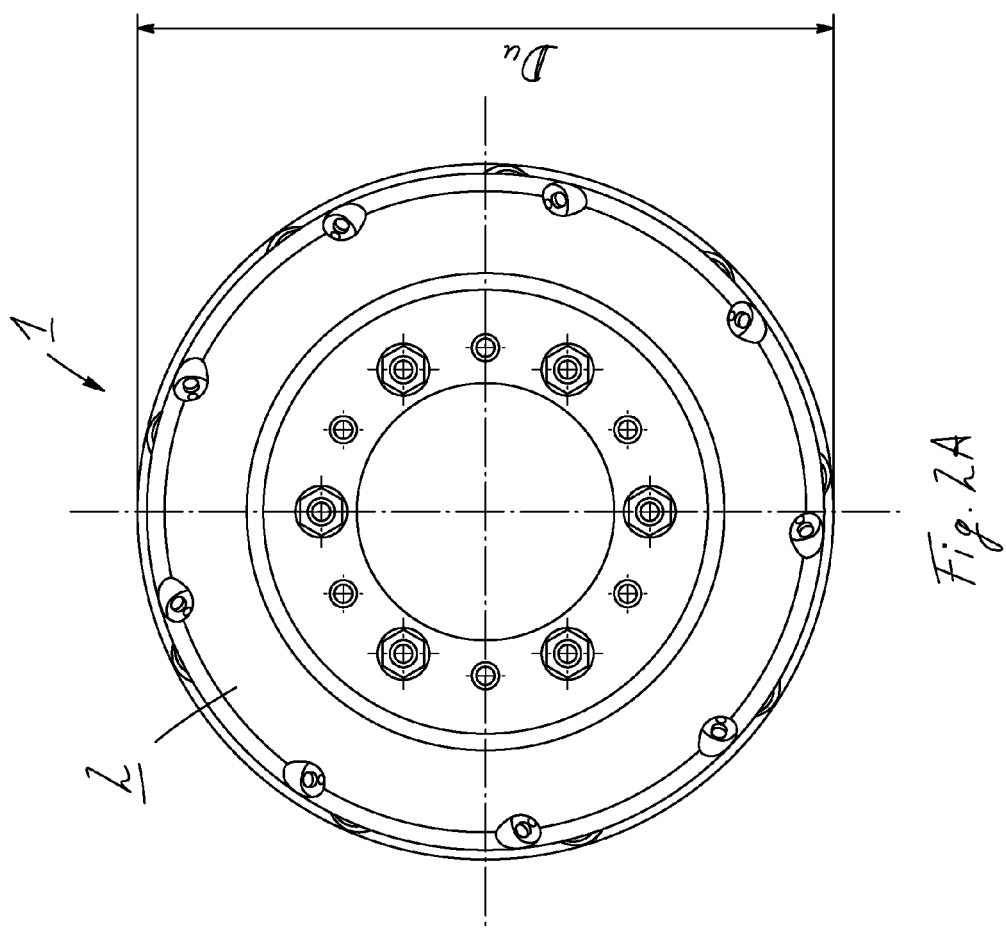

| | | | |
|---|---|---|---|
| 4,715,460 A * | 12/1987 | Smith | 180/7.1 |
| 5,551,349 A * | 9/1996 | Bodzin | 104/138.2 |
| 6,179,073 B1 | 1/2001 | Chhabra et al. | |
| 6,340,065 B1 * | 1/2002 | Harris | 180/7.2 |
| 6,360,865 B1 * | 3/2002 | Leon | 193/35 MD |
| 6,592,189 B1 * | 7/2003 | Back, Sr. | 301/5.308 |
| 6,796,618 B2 * | 9/2004 | Harris | 301/5.1 |
| 7,293,790 B2 * | 11/2007 | Byun et al. | 280/262 |

* cited by examiner

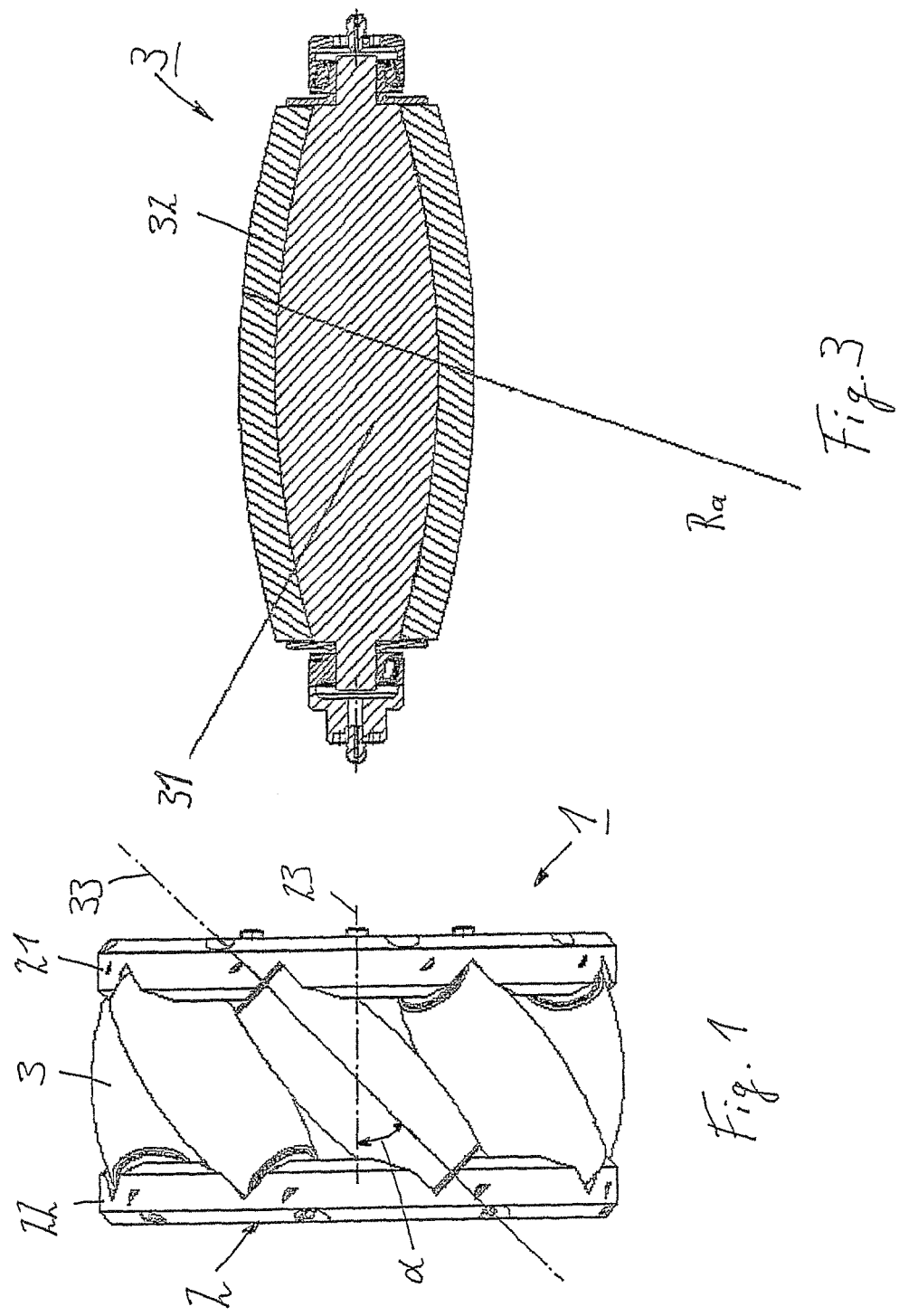

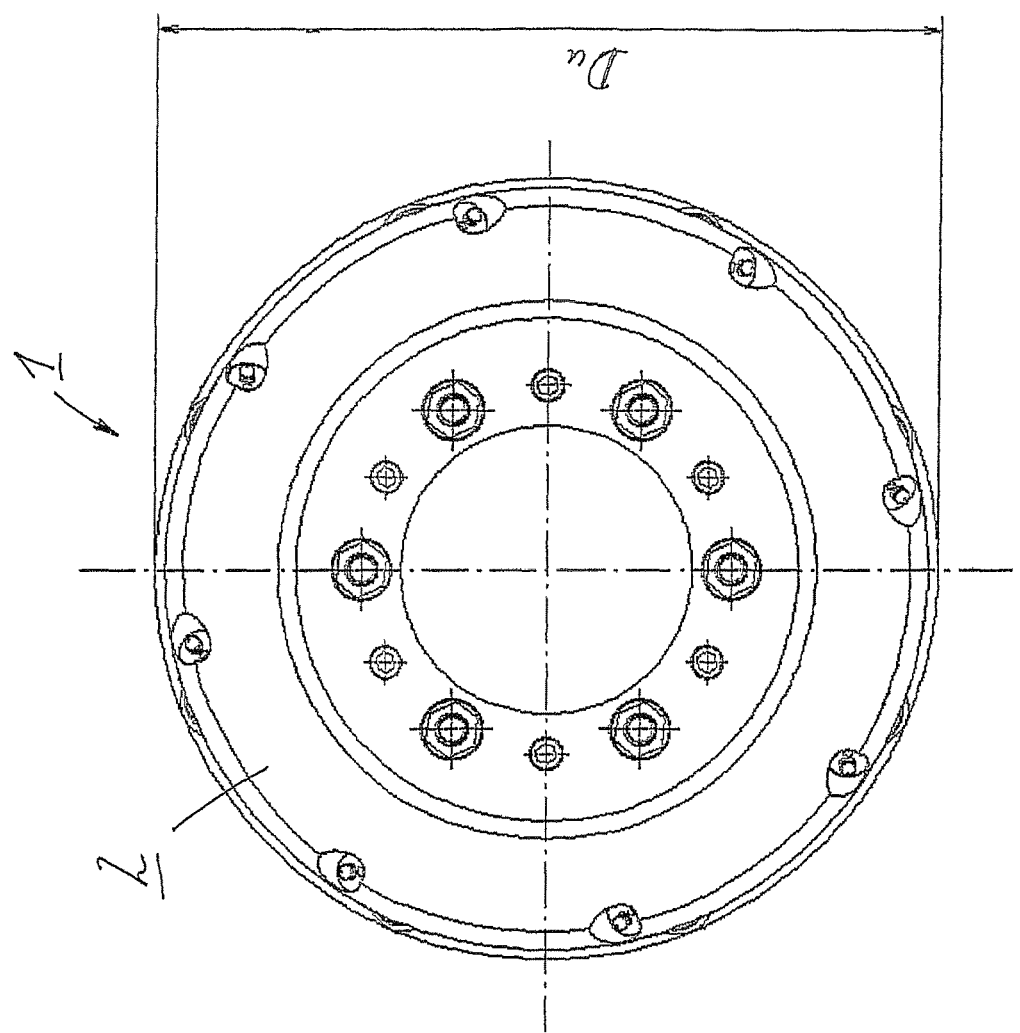

WHEEL

The present invention relates to a wheel, with a driven wheel body that has two support elements, between which a plurality of rolling elements with a crowned surface are rotatably situated, which project at least partially beyond the extent of the support elements, and whose axes of rotation are aligned obliquely to the axis of rotation of the wheel body. Such a wheel may be used advantageously in particular in heavy duty shunting vehicles.

A railless industrial truck, maneuverable on all sides, is known from DE 38 41 971 02, which has subframes on which a steering roller and a driven wheel are situated. The driven wheels have rolling elements whose surface is of crowned or barrel-shaped design, and whose rolling element axes are at an angle to the axis of the driven wheel. Such driven wheels are known by the name "Mecanum wheels."

The Mecanum wheels known from the existing art have the disadvantage that they run irregularly, in particular when rolling elements are mounted on wheel bodies of different diameters.

Starting from this existing art, the object of the invention is to improve a wheel conforming to the genre, with regard to its running properties.

This problem is solved by a wheel having features in accordance with the present invention. Preferred embodiments and refinements of the invention are described in the subordinate claims. The wheel according to the invention, with a driven wheel body that has two support elements, between which a plurality of rolling elements with a crowned surface are rotatably situated, which project at least partially beyond the extent of the support elements, and whose axes of rotation are inclined obliquely to the axis of rotation of the wheel body, provides that the ratio of the outside diameter of the wheel to the maximum radius of the rolling elements is between 1.08 and 1.13, in particular between 1.09 and 1.12. Surprisingly, it has been found that with such a ratio of the theoretical outside diameter of the wheel, i.e. of the diameter of the unloaded wheel, to the maximum radius of the rolling elements, the wheels run very uniformly with great running smoothness, and have high concentricity. That makes it possible to perform highly precise positioning tasks, even with very heavy loads. Very good rolling behavior has been found at a ratio between 1.10 and 1.11, in particular at 1.107.

A refinement of the invention provides that the rolling element includes a crowned carrier body and a plastic coating applied to the outer circumference of the carrier body, in particular of a polyurethane elastomer of substantially constant thickness. An exemplary polyurethane elastomer that may be used is manufactured under the trade name VULKOLLAN®. Because of the crowned design of the carrier body and a plastic coating uniformly applied to the outer circumference of the carrier body, uniform loading and deformation of the plastic layer over the entire radius of the rolling element is ensured. Whereas with traditional elements, whose crowning is produced by the plastic coating, a different deformation is present in the area of the greatest material thickness of the plastic coating than in the marginal area, which results in uneven carrying and rolling performance, in the case of the rolling element according to the invention the deformation—and hence the contact surface—remains unchanged over the entire rolling radius of the rolling element.

Uniform curvature of the carrier body, and hence also of the surface of the rolling element, promotes the uniformity of running.

The axes of rotation of the rolling elements are preferably situated at an angle of 45° to the axis of rotation of the wheel body, so that a nearly transition-free change from one rolling element to the next can occur during continuous rolling motion. Surprisingly, it has been found that with an arrangement of nine rolling elements on the wheel body, the force and load distribution is especially uniform at the preferred ratio of the outside diameter of the wheel to the maximum roller radius. The nine rolling elements here are situated at uniform distances from each other on the wheel body.

An exemplary embodiment of the invention will be explained in greater detail below on the basis of the appended figures. The figures shown the following:

FIG. 1: a front view of a wheel according to the invention;
FIG. 2: a side view of FIG. 1; and
FIG. 2A: a side view of an alternative embodiment of a wheel according to the invention;
FIG. 3: an individual depiction of a rolling element in a sectional view.

FIG. 1 shows a front view of a wheel 1 with a wheel body 2, which has two carrier elements 21, 22 that are constructed as wheel disks spaced at a distance from each other. The carrier elements 21, 22 may be moved by a drive (not shown), and are rigidly joined to each other. Wheel body 2 is mounted so that it can rotate in both directions around its axis of rotation 23.

Rolling elements 3 are situated at uniform intervals from each other between the rigidly joined support elements. The rolling elements 3 have a crowned outside contour, and are positioned with their axes of rotation 33 at an angle of preferably 45° to the axis of rotation 23 of the wheel body 2. The rolling elements 3 are supported between the carrier elements 21, 22 so that they can turn freely, and their outside contour projects slightly beyond the outer extent of the carrier elements 21, 22, so that they form the contour surface and rolling surface of wheel 1 on the undersurface (not shown).

In the embodiment depicted in FIG. 2, a total of eight rolling elements 3 are provided at uniform intervals in wheel 1; a preferred embodiment of the invention provides that nine rolling elements be fastened between the carrier elements 21, 22 so that they can turn freely, at uniform intervals from each other (see FIG. 2A). The outside diameter $D_u$, i.e. the diameter on which wheel 1 revolves, and the maximum roller radius $R_a$, are preferably at a ratio of 1.107 to each other, whereby optimal rolling behavior of wheel 1 is ensured, irrespective of the outside diameter $D_u$.

FIG. 3 shows a rolling element 3 in cross sectional view, from which it can be seen that the rolling element 3 is made up of an elliptical carrier body 31, preferably made of a cast material such as Ferroguss, and a plastic coating 32 on the outside of the crowned carrier body 31. The plastic coating 32 has a constant thickness, and is preferably made of a polyurethane elastomer of high load-carrying capacity. The maximum roller radius R.sub.a also defines the constant curvature of both the carrier body 31 and the plastic coating 32. The rolling elements 3 each have an outer rolling surface with an arcuate profile in a section plane through and aligned with the axis of rotation 33 of the rolling element 3.

The invention claimed is:
1. A wheel having a circular profile with an outer diameter, the wheel comprising:
a wheel body including first and second oppositely disposed support members, said wheel body having a rotational axis; and
a plurality of rolling elements coupled to said wheel body and extending between said first and second support members, each said rolling element comprising an elliptical carrier body and a smooth, homogenous polymeric coating on said elliptical carrier body, said polymeric coating having a constant thickness along a lengthwise direction of said elliptical carrier body;

each said rolling element having a rolling axis inclined obliquely to said rotational axis of said wheel body and having an outer rolling surface with an arcuate profile in a section plane through and aligned with said rolling axis, said arcuate profile defined by a maximum radius;

wherein a ratio of the outer diameter of the wheel to said maximum radius is approximately 1.08 to approximately 1.13.

2. The wheel of claim 1, wherein said ratio of the outer diameter of the wheel to said maximum radius is approximately 1.09 to approximately 1.12.

3. The wheel of claim 1, wherein said ratio of the outer diameter of the wheel to said maximum radius is approximately 1.10 to approximately 1.11.

4. The wheel of claim 1, wherein said ratio of the outer diameter of the wheel to said maximum radius is approximately 1.107.

5. The wheel of claim 1, wherein said polymeric coating comprises polyurethane.

6. The wheel of claim 1, wherein each said rolling axis of said rolling elements is inclined at an angle of approximately 45 degrees to said rotational axis of said wheel body.

7. The wheel of claim 1, wherein said maximum radius is constant along said entire rolling surface.

8. The wheel of claim 1, comprising nine rolling elements coupled to said wheel body and spaced evenly around said wheel body.

9. The wheel of claim 1, wherein said rolling elements are driven.

* * * * *